(12) United States Patent
Orndorff et al.

(10) Patent No.: US 6,978,883 B2
(45) Date of Patent: Dec. 27, 2005

(54) CONVEYOR AND METHOD OF USING

(75) Inventors: Jason Matthew Orndorff, Lawrenceburg, IN (US); Jeffrey Wes Martin, Jackson, TN (US); Kenneth Leonard Ruehl, Cincinnati, OH (US)

(73) Assignee: Procter & Gamble Co., Cincinnati, OH (US)

( * ) Notice: Subject to any disclaimer, the term of this patent is extended or adjusted under 35 U.S.C. 154(b) by 0 days.

(21) Appl. No.: 10/406,893

(22) Filed: Apr. 4, 2003

(65) Prior Publication Data

US 2004/0195075 A1    Oct. 7, 2004

(51) Int. Cl.[7] ............................................. B65G 23/00
(52) U.S. Cl. ..................... 198/792; 198/334; 198/459.1
(58) Field of Search ................. 198/792, 334, 198/459.1, 462.3, 461.3, 850, 851

(56) References Cited

U.S. PATENT DOCUMENTS

| | | | |
|---|---|---|---|
| 3,707,923 A | * | 1/1973 | Woodling .................... 104/137 |
| 3,712,448 A | * | 1/1973 | Burson et al. ............... 198/334 |
| 3,842,961 A | * | 10/1974 | Burson ........................ 198/334 |
| 3,884,152 A | * | 5/1975 | Emeriat ........................ 104/25 |
| 4,462,514 A | | 7/1984 | Dunstan |
| 4,930,622 A | * | 6/1990 | Sansevero .................... 198/328 |
| 4,953,685 A | * | 9/1990 | Johnson ....................... 198/328 |
| 5,220,996 A | | 6/1993 | Noestheden |
| 5,465,826 A | | 11/1995 | Noestheden |
| 5,810,540 A | | 9/1998 | Castaldi |
| 5,895,332 A | | 4/1999 | Olson et al. |
| 5,899,316 A | | 5/1999 | Ueno et al. |
| 6,170,244 B1 | | 1/2001 | Coers et al. |
| 6,367,610 B1 | | 4/2002 | Fortenbery et al. |

OTHER PUBLICATIONS

Daido Corp., www.daidocorp.com.
Tsubakimoto Chain Co., www.tsubakimoto.com.
Morse Chain, www.emerson-ept.com.

* cited by examiner

*Primary Examiner*—Gene O. Crawford
*Assistant Examiner*—Rashmi Sharma
(74) *Attorney, Agent, or Firm*—S. Robert Chuey; Peter D. Meyer

(57) ABSTRACT

A conveyor for transporting articles is disclosed. The conveyor is for transporting articles having an initial pitch, wherein the initial pitch of the articles is subsequently decreased and/or increased. After the subsequent increase and/or decrease in pitch, the initial pitch can then be restored or a different pitch obtained.

16 Claims, 5 Drawing Sheets

CONVEYOR AND METHOD OF USING

FIELD OF INVENTION

The present invention relates to a conveyor for transporting articles. More particularly, the present invention relates to a conveyor for transporting articles having an initial pitch, or spacing, wherein the initial pitch of the articles is subsequently decreased and/or increased.

BACKGROUND OF THE INVENTION

Devices for transporting a sequence or plurality of articles, also known as conveyors, are well known in the art. Additionally, methods for changing the spacing, or pitch, between consecutive or alternating articles on a conveyor are known. Consequently it has been found that when the spacing between adjacent articles is changed, the speed of the articles in relation to a system can also change. For example, transferring articles from a fast moving conveyor to a slow moving conveyor can generally decrease the article spacing. Conversely, the transfer of articles from a slow moving conveyor to a fast moving conveyor can increase the spacing between adjacent articles. However, these methods can be problematic because a wide variability in the spacing can be introduced and remain after such a transfer, especially at high speed. In processes where an article is affected by subsequent, concurrent, and precisely timed process mechanisms, this variability in article spacing can be unacceptable.

For example, a change in the spacing between a sequence of articles can be introduced with the use of a variable-pitch feed screw. While the use of a variable-pitch feed screw can maintain spacing accuracy better than a direct transfer between conveyors having differing speeds, relative motion between the screw and the article being transferred can cause rapid wear of the screw in a high-speed application or in applications incorporating large article accelerations.

Another method to change the spacing between articles employs the use of two partially parallel endless rail and trolley systems. Here, pivotable and articulated connecting arms interconnect spacing members. The articulated connecting arms pivot at the spacing members and at a point intermediate to adjacent spacing members. The path of a second rail and trolley system is adjusted relative to the first rail and trolley system. This adjustment then determines the amount of spacing experienced by the spacing members. However, this system can be problematic. Forces perpendicular to the rail can be extremely high when the spacing between articles is reduced to near zero, since the articulated connecting arm is nearly perpendicular to the rail. In a process that transports heavy objects over great distances, the resulting forces can become unacceptably high.

Other exemplary systems that provide article orientation utilizing cam paths can be found in Coers, U.S. Pat. No. 6,170,244; and Dunstan, U.S. Pat. No. 4,462,514. Exemplary conveyor systems can be found in Olson et al, U.S. Pat. No. 5,895,332; Noestheden, U.S. Pat. No. 5,220,996; Fortenbery et al., U.S. Pat. No. 6,367,610; Castaldi, U.S. Pat. No. 5,810,540; and Ueno et al., U.S. Pat. No. 5,899,316. Exemplary chains sold by the Tsubakimoto Chain Co., including designations RF-type and BF-type, can be used in conveyor processes that require double-pitched chains or chains having rollers and/or bucket elevators disposed thereon. Other specialty chains suitable for a conveyor are sold by the Daido Corporation of America and include the categories of tortilla chain, citrus chain, mid-pitch hole chain, and D.I.D. pin oven chain.

Therefore, it would be an advantage to provide a conveyor system that is capable of increasing the through-put of a production process system that is capable of maintaining the production speed, as required by the process and yet minimize any forces generated during a spacing operation.

SUMMARY OF THE INVENTION

Figure 1:
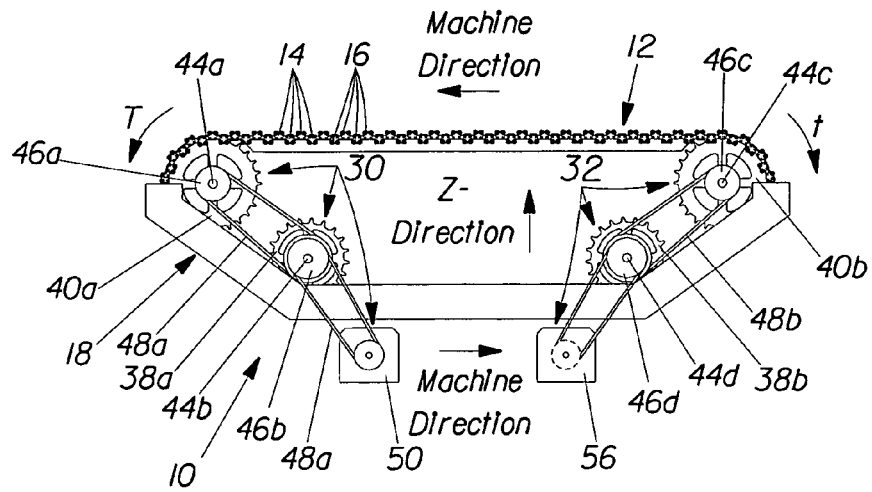
FIG. 1 is a side elevational view of a conveyor according to the present invention.

The present invention is a conveyor system comprising a first track having a machine direction, a cross-machine direction orthogonal thereto, and a Z-direction orthogonal to the machine direction and the cross-machine direction, and a first chain comprising a plurality of successive connected links operatively associated with the first track, whereby the chain can move in the machine direction along the first track, the first track has a first track portion and at least a second track portion. The first track portion and the second track portion are spaced apart in at least one of the cross-machine direction or the Z-direction. Further, a plurality of first track followers are disposed on the successive links so that a first portion of each of the links is operatively associated with the first track portion and disposed upon a first plurality of the successive links and at least a second portion of the links is operatively associated with the second track portion and disposed upon a second plurality of the successive links so that a third plurality of the successive links spans the spacing between the first track portion and the second track portion so that the chain is foreshortened in the machine direction.

The present invention is also a conveyor comprising a plurality of interconnected links that each have a major axis substantially parallel to the machine direction. The major axis has an orientation. Upon engagement of the links with the respective first track portions, the orientation of the major axis of a link intermediate thereto changes in at least one of the cross-machine direction or the Z-direction so that the major axis is skewed relative to the machine direction.

The present invention is also a pushable chain comprising a first protuberance disposed on a first link and a second protuberance disposed on a second link of a plurality of interconnected links. Each interconnected link has a major axis that defines a machine direction and an orientation thereto. The orientation of the major axis of the first link and the second link remains substantially constant during the transmission of a driven compressive force therebetween in the machine direction upon a mating engagement of the first protuberance and the second protuberance.

The present invention is also a link plate for a chain comprising a generally planar body comprising a first face and a second face opposed thereto. The generally planar body comprises two spaced apart apertures therein. Each aperture receives a complementary roller therein and defines a major axis therebetween. The body of the link plate has a major dimension parallel to the major axis lying within the first face of the body. The link plate further comprises a protuberance extending from the major axis so that the protuberance can contact a complementary protuberance of another link plate upon pivoting from a first position to a second position so that the protuberances can transmit a compressive force therebetween when the link plate is driven in a closed loop chain.

The present invention is also a method for foreshortening a chain. The method comprises the steps of: (a) supplying a first track having a machine direction, a cross-machine direction orthogonal thereto, and a Z-direction orthogonal to the machine direction and the cross-machine direction, the track having a first track portion and a second track portion, the first track portion and the second track portion being spaced apart in at least one of the cross-machine direction or the Z-direction; (b) supplying a first chain comprising a plurality of connected successive co-linear links operatively associated with the track and moving the chain in the machine direction along the track; (c) disposing a plurality of track followers upon the successive links whereby a first portion of the track followers is operatively associated with the first track portion and at least a second portion of the track followers is operatively associated with the second track portion; and (d) moving the chain in the machine direction, whereby a third plurality of the links spans the spacing between the first track portion and the second track portion, thereby foreshortening the chain in the machine direction.

DETAILED DESCRIPTION OF THE INVENTION

The present invention is related to a conveyor for transporting articles. Articles on or supported by the conveyor have an initial spacing, or pitch, that is subsequently changed (i.e., the pitch is increased and/or decreased). For example, articles can be loaded onto a conveyor system at an initial spacing to accommodate the loading process. After loading, the spacing between the articles can be changed to accommodate a processing step. After processing, the articles can be provided with a new spacing for further processing. By way of example, the new spacing can be the initial article spacing.

Referring to FIG. 1, the alteration of the article spacing is accomplished by the controlled foreshortening or lengthening of a conveyor chain by moving alternating links in a direction away from, or towards, the machine direction of the chain respectively. The machine direction is the instantaneous direction that the conveyor traverses over the course of one revolution. The machine direction can be parallel to the major axis of the links comprising the conveyor. The cross-machine direction is perpendicular to the machine direction in the plane of the conveyor. The Z-direction is orthogonal to both the machine and cross-machine directions. In a chain incorporating roller links, the major axis of the link is in the roller-to-roller direction. In a chain configuration not incorporating rollers, the major axis of each link is in the longest terminus-to-terminus direction.

Without desiring to be bound by theory, it is believed that this process can be visualized as shaping a straight-line, having a generally infinite wavelength, into a trapezoidal form having a generally finite wavelength. In other words, a section of chain in a loop of chain can go from an essentially linear configuration to an essentially trapezoidal waveform having alternating links forming two or more levels and vice-versa. This transformation can increase the number of links present in a given linear distance.

As shown in FIG. 1, the conveyor 10 comprises a first chain 12 and a first track 18. First chain 12 comprises a first series, or plurality, of interconnected first links 14 and at least one track follower 16 disposed adjacent to at least one of the first links 14. One of skill in the art would understand that track follower 16 can be disposed proximate to first links 14, connected to first links 14, internal to first links 14, separately joined to first links 14, or otherwise comprise first links 14. One of skill in the art will also understand that track follower 16 can comprise mechanical, electromagnetic, fluid, and/or frictional followers. Conveyor 10 also comprises a first drive system 30 and optional second drive system 32, each having at least one pusher sprocket 38a, 38b to move chain 12 through a complete cycle.

Figure 3:
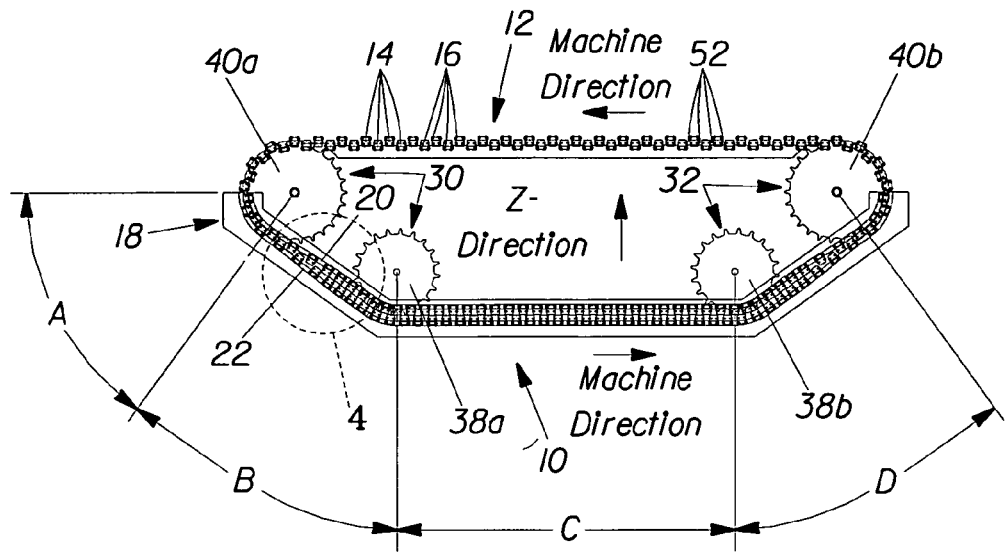
FIG. 3 is a cross-sectional view of FIG. 2 taken along line 3—3.

As shown in FIG. 3, first drive system 30, comprising sprocket 38a, can be utilized to reduce first track 18 loads through the transition of first chain 12 going from a straight-line configuration to a stacked configuration. Without desiring to be bound by theory, it is believed that during this transition, first track portion 20 and second track portion 22 of first track 18 can be subjected to reactive forces due to the configuration of first link 14 and track follower 16. In an exemplary system, the reactive forces against the first track portion 20 and second track portion 22 of first track 18 can go from almost negligible in the regions where first chain 12 is following the machine direction of first chain 12 just prior to transition to the theoretical maximum when first chain 12 is in a foreshortened configuration. Thus, the addition of a drive sprocket 38a to first drive system 30 at the end of the transition section can isolate the first links 14 of first chain 12 that are still in transition from the force required to push the foreshortened first links 14 through the conveyor 10.

Figure 2:
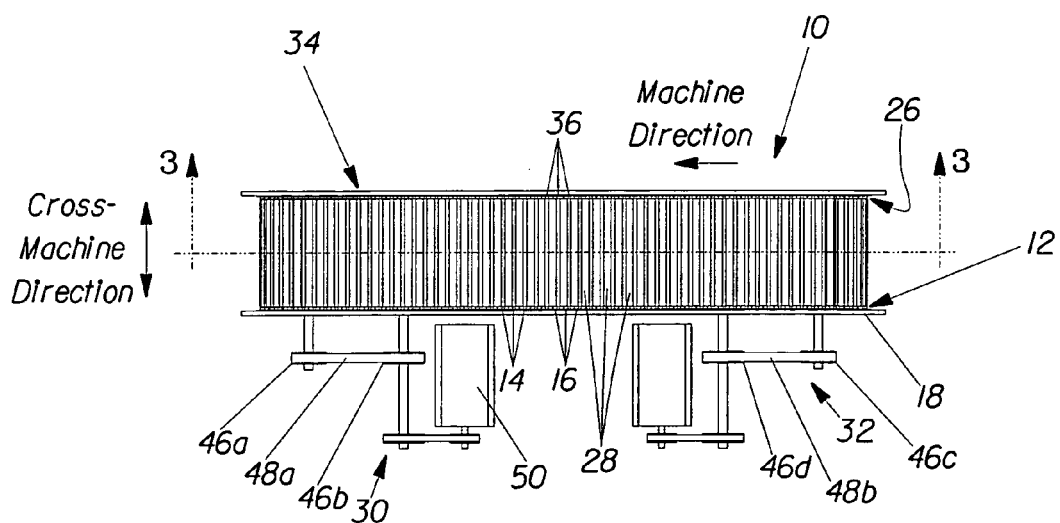
FIG. 2 is a plan view of the conveyor of FIG. 1.

FIG. 2 shows a conveyor 10 comprising an optional second chain 26, an optional plurality of extensible linking members in the form of optional extensible carriers 28 transversely connecting first chain 12 and second chain 26, and an optional second track 34. As with first chain 12, second chain 26 can generally comprise a second series, or plurality, of interconnected second links 36 and at least one track follower 16 disposed adjacent to, and connected to, at least one of the second links 36. Referring again to FIG. 2, optional carriers 28 are generally disposed transversely between first chain 12 and second chain 26. It is believed that carriers 28 can be extensible and used to hold, suspend, or otherwise support articles as first chain 12 and second chain 26 move about the conveyor 10. If desired, articles can be suspended above or below carriers 26, for example, from hooks connected to carriers 28. Further, it is believed that articles can be suspended directly from first chain 12 if conveyor 10 is utilized as a single chain conveying system.

Controlling the position and orientation of individual links in a chain by mounting to, inserting into, or otherwise associating track followers with the chain links can produce a chain having the trapezoidal form described above. For example, links could have track followers attached thereto that force the links to follow a prescribed track path. Forcing a link with a track follower attached thereto to follow any number of track paths could produce a chain having the trapezoidal waveform shape described above, or any other configuration that may be necessary for a particular application. Further, it would be possible for one of skill in the art to provide track/track follower/link geometries to provide virtually any geometric arrangement of links that can result in a foreshortened chain or a conveyor system having an unlimited number of levels of chain links therein.

Figure 4:
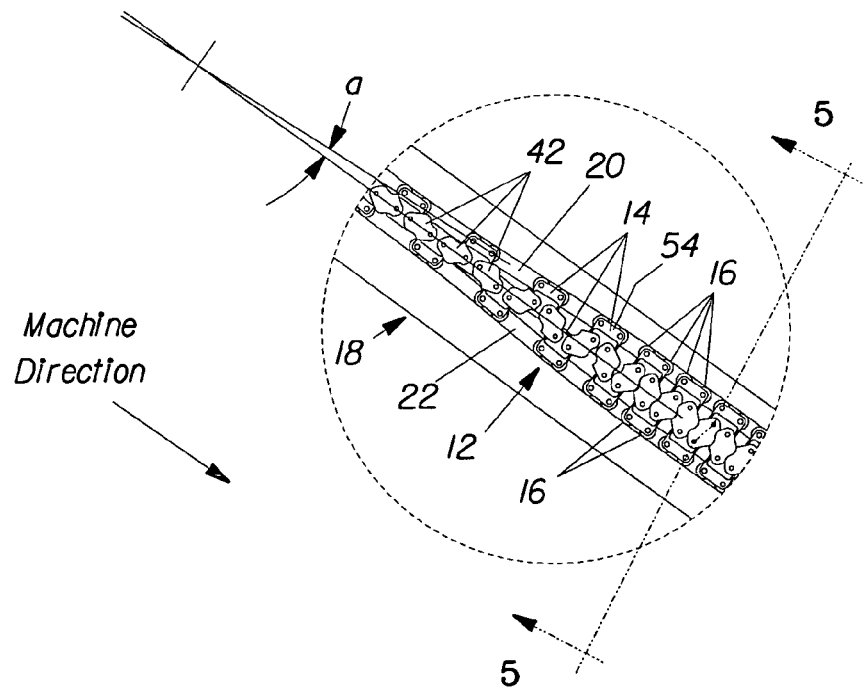
FIG. 4 is a fragmentary elevational view of the region labeled 4 in FIG. 3.

As shown in FIGS. 3 and 4, an exemplary but non-limiting track 18 comprises a first track portion 20 and at least a second track portion 22. First track portion 20 and second track portion 22 define the path that the track followers 16 follow to achieve the motion of first chain 12 as described, supra, through the deviation, a, from the machine direction. In other words, because track followers 16 are connected to first links 14 and follow either first track portion 20 or second track portion 22, first track portion 20 and second track portion 22 define the displacement of certain first link 14 in the cross-machine direction and/or the Z-direction. In a preferred embodiment, the first track portion 20 and second track portion 22 are rigidly mounted in a plane substantially parallel to the plane subtended by first chain 12 as it bends. It is also possible for first track portion 20 and second track portion 22 to diverge, singly or in unison, from a common track portion of track 18.

Additionally, a first track follower 16 is connected to first chain 12 to facilitate placement and movement of track follower 16 within the first track portion 20 or the second track portion 22. In this way it can be seen that first links 14 having a first track follower 16 can engage the first track portion 20 of track 18 and first links 14 having a second track follower 16 can engage the second track follower portion of track 18. As shown in FIGS. 3 and 4, as first track 20 of track 18 diverges from second track portion 22 of track 18, the first link 14 associated with a first track follower 16 of first chain 12 can diverge with respect to the first link 14 associated with a second track follower 16 of first chain 12.

Initially, a first chain 12 having a track follower 16 disposed adjacent to at least one first link 14 is provided in a straight line configuration. The chain is then foreshortened in the machine direction. Thus, when the spacing between the links of first chain 12 having a track follower 16 disposed adjacent thereto is foreshortened, the resulting first chain 12 is said to be in a "stacked" or "compressed" configuration. A stacked configuration can provide at least two levels, or layers, of first links 14 of first chain 12. Further down the path of first chain 12, the first chain 12 is then pulled in the machine direction, or is in tension, prior to exiting track 18 and the resulting first chain 12 pitch line is restored to the starting straight-line form. This can also be referred to as the "un-stacked" or "non-compressed" configuration. This resulting straight-line form of first chain 12 can then be circulated back to the input of track 18, thereby forming a continuous loop.

As shown in FIG. 3, first chain 12 is preferably a roller chain having a major axis of each link in the roller-to-roller dimension that is parallel to the machine direction, a constant width, and constant pitch (i.e., the distance between adjacent links) and can be supplied with an angle of articulation that minimizes impact between the rollers of first chain 12 and the sprocket teeth of the first drive system 30 and/or the second drive system 32. However, one of skill in the art would realize that any type of chain, belt, cable, rope, or wire could be adapted for use as first chain 12 and provide the advantages of the present conveyor 10, all of which are referred to as "chains" herein.

Track follower 16, in the form of a roller, can be disposed proximate to first links 14 of first chain. 12. In a preferred embodiment, the axis about which track follower 16 rotates is generally substantially parallel to the axis of the pins connecting the individual links 14 of first chain 12. Track follower 16 guides first links 14 of first chain 12 along the path direction of first track portion 20 or second track portion 22 of track 18 upon the engagement of first track follower 16 with track 18. Track followers 16 are preferably provided in a 1:1 relationship with a first link 14 and are positioned to be equidistant from the first link 14. The track followers 16 can then cause the corresponding first links 14 of first chain 12 to deviate from the machine direction in the cross-machine and/or Z-directions as first track portion 20 and second track portion 22 of track 18 likewise deviate in the cross-machine and/or Z- directions.

In the preferred embodiment of FIG. 4, every other first link 14 of first chain 12 is capable of deviating from the machine direction of first chain 12. However, it should be realized that due to the presence of track followers 16, it would be possible for every other first link 14 of first chain 12 to deviate in any direction away from, or toward, the machine direction of chain 12. It is also possible for the spacing links (first links 14 not having a track follower 16 disposed proximate thereto), in the form of connecting links 52, to deviate in a direction toward, or away, from the machine direction of first chain 12. In this regard, deviation of first links 14 or connecting links 52 can be rotational with respect to an axis orthogonal to the machine direction of first chain 12. This rotation can be lateral with the machine direction of first chain 12 (i.e., the cross-machine direction) or parallel to the path direction of first chain 12 (i.e., the Z-direction). In any regard, since these alternating links are connected by a connecting link 52 having a fixed length, a change in the spacing in a direction away from the machine direction can also result in a change in the spacing between similarly situated first links 14 having track followers 16 disposed proximate thereto.

Referring again to FIG. 1, preferably first drive system 30 is engageable to push all of first chain 12 that is in a stacked configuration to a point downstream in the conveying process where tension is applied to first chain 12 in order to decrease or remove the stacking present in first chain 12. One of skill in the art could also use first drive system 30 to push the portion of first chain 12 that is in a stacked configuration to a point downstream where additional stacking occurs. Thus, first drive system 30 preferably comprises two sets of drive sprockets 38a, 40a. In a preferred embodiment, the profile and spacing of the teeth on drive sprocket 38a of first drive system 30 are shaped to engage only the rollers of first links 14 when first links 14 are offset in the cross-machine direction or Z-direction of first chain 12. Without desiring to be bound by theory, it is believed that upstream pushing of a compressed first chain 12 rather than pulling a compressed first chain 12 from downstream can allow adjacent first links 14 to contact each other, just before vertical orientation is reached, thereby transmitting the driving force completely through those first links 14. This contact can also stop the folding of first chain 12 at a well-defined spacing, eliminating the need for the track 18 to do so.

As can be seen in FIG. 3, the teeth disposed on sprockets 40a, 40b in this embodiment are shaped to engage first chain 12 or second chain 26 in a tension condition. The teeth on sprockets 38a, 38b are shaped to engage only the resulting upper level chain rollers of adjacent carrier links when first chain 12 or second chain 26 is in a compressed configuration. It should be noted that in the present embodiment, when first chain 12 or second chain 26 is in a compressed configuration, an upper level and lower level of first chain 12 and/or second chain 26 is formed. Thus, sprocket 38a would drive the respective entirety of stacked first chain 12 or second chain 26 and associated carriers to sprocket 38b. Therefore, between sprockets 40a, 38a, the first chain 12 or second chain 26 transitions from a tension configuration to a compressed, or stacked, configuration. Between sprockets 38*b*, 40*b*, the first chain 12 or second chain 26 transitions from compressed, or stacked, configuration to a tension configuration.

Thus, as first chain 12 moves about conveyor 10 in a counterclockwise direction, first drive system 30 can provide upstream drive to chain 12 with motor 50. An optional motor 56 can be similarly provided for second drive system 32. Further, if conveyor 10 is physically long, it may be impractical to couple a drive chain, shaft, or other power transfer device from motor 50 to second drive system 32. This can further facilitate the need for an optional motor to be associated with second drive system 32. In this regard, an optional motor 56 operatively associated with second drive system 32 can be required for at least two instances.

First, if first chain 12 must move about conveyor 10 in a clockwise direction, second drive system 32 could provide the necessary drive. Drive system 32 could also assist in providing first chain 12 with movement in and away from the machine direction if bilateral motion of first chain 12 is desired.

Second, it is known to one of skill in the art that a chain take-up system (not shown) can be installed along the non-compressed span of first chain 12 to allow for fluctuations in first chain 12 due to first chain 12 stretching, first chain 12 wear, or other system wear. When such a take-up system induces a tension in first chain 12, it is believed that the take-up system could pull first chain 12 out of the compressed configuration, since minimal chain tension exists in the compressed configuration. Thus, the application of a constant reverse direction torque, t, to sprocket 38*b* with an optional motor 56 can overcome the tension induced by the take-up. Thus, first chain 12 can then be forced into a compressed configuration and simultaneously have an induced tension where required.

Without desiring to be bound by theory, if tension is reduced due to the stacked configuration of first links 14 of first chain 12, and the stacked first chain 12 is pushed through a portion of the conveyor 10, a chain take-up located in the first chain 12 return path can effectively pull the first links 14 of the first chain 12 out of the stacked configuration. Therefore, a second drive system 32 can be provided as a chain control point downstream of the stacked portion of first chain 12 of conveyor 10. In this regard, if first drive system 30 applies a torque, T, in the path direction of first chain 12, the second drive system 32 can apply torque, t, in the direction opposite the path direction of first chain 12 to react against take-up in the return chain path direction. Thus, if the corresponding first chain 12 torques are related so that T>>t, and tension induced by the chain take-up system is less than t, then second drive system 32 can keep a proper amount of first chain 12 in the stacked configuration while maintaining sufficient tension in the return path to make up for first chain 12 stretch and any other overall system wear.

The forces exerted upon track 18 can originate in the force developed by first drive system 30, the force required to accelerate first links 14 and carriers 28 (if employed) at the end of the compressed section of first chain 12, and the rolling friction of first track followers 16 on track 18. It is believed that these three sources of load act mostly parallel to track 18. Thus, the forces of concern that are exerted on track 18 are mostly perpendicular to track 18, in the plane of first chain 12 bending.

The transformation of forces that are parallel to first track 18 into forces that are perpendicular to track 18 can be through the connecting links 52 of first chain 12. Since the first links 14 having a track follower 16 disposed proximate thereto are connected by pivoting joints, it is believed that the majority of forces present in the connecting link 52 connecting adjacent first links 14 having a track follower 16 disposed proximate thereto, are along its length. Thus, a connecting link 52 that is parallel to the first track 18 could transfer nearly all driving forces. As the connecting links 52 move into a compression position, they rotate toward an orientation that can be skewed relative to the machine direction in the cross-machine direction and/or Z-direction and preferably perpendicular to the first track 18 in the cross-machine direction and/or Z-direction of first chain 12. In this orientation, only a small component of the force being transferred through the connecting link is in a direction parallel to the track 18, and therefore, contributing to the forward motion of first chain 12. It is believed that the most efficacious transfer of force occurs when the major axis of an individual connecting link 52 is skewed relative to the machine direction at an angle ranging from 1 degree to 90 degrees, preferably 45 degrees to 90 degrees.

The greater component of force in a connecting link 52 is in a direction perpendicular to first track 18. This being the case, a very large driving force must be applied to the first chain 12 so that the small force component parallel to first track 18 transferred through a connecting link 52 is large enough to move first chain 12 forward. However, the remainder of a large driving force is likely transferred to the first track 18, possibly resulting in wear of first track 18.

Figure 5:
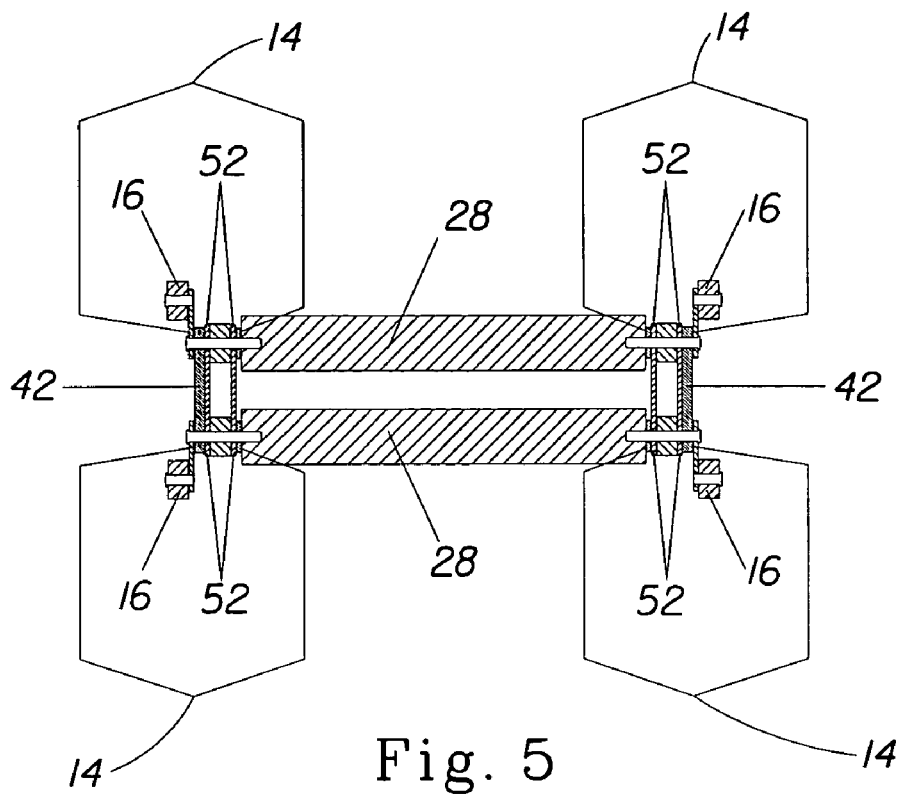
FIG. 5 is a cross-sectional view of FIG. 4 taken along line 5—5.
Figure 6:
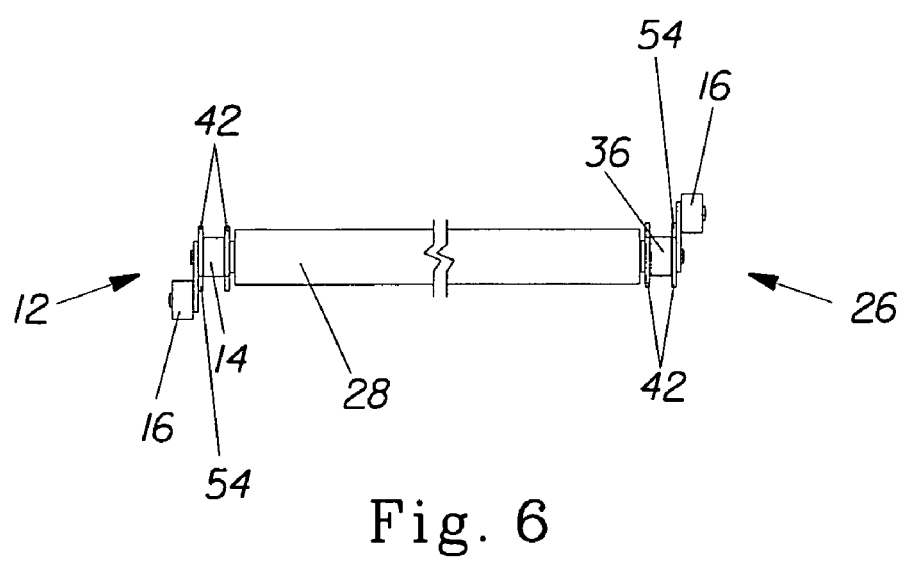
FIG. 6 is an elevational view of an exemplary chain and carrier embodiment.

As shown in FIGS. 4–6, first chain 12 can be provided with a protuberance in the form of stop blocks 42 that can maximize the machine direction driving force and limit the amount of deviation of first chain 12 from the path direction of conveyor 10. As shown in FIGS. 4–5, stop blocks 42 can be disposed upon connecting links 52 that are disposed between adjacent first links 14 of first chain 12 having track followers 16 disposed proximate thereto. Providing stop blocks 42 in this manner can provide at least two benefits: first, stop blocks 42 can contact adjacent stop blocks 42 in the form of a mating engagement (i.e., the efficacious contact of adjacent surfaces); second, stop blocks 42 can also limit forces exerted on first track 18.

As shown in FIG. 6, stop blocks 42 can comprise the connecting links 52 that are disposed between adjacent first links 14 of first chain 12 having track followers 16 disposed proximate thereto. For example, first chain 12 can comprise a series of numbered links (i.e., even and odd). The odd numbered links of first chain 12 can be provided with track followers 16 (as discussed, supra), and the even numbered links of first chain 12 can be provided with stop blocks 42. Providing stop blocks 42 in this manner can provide the additional benefit of serving as a direct connection between adjacent first links 14 having track followers 16 disposed proximate thereon. Further, providing stop block 42 as the connecting link 52 can also reduce the cross-machine direction profile of connecting link 52 thereby reducing the distance required between an opposed first track 18 and optional second track 34.

Stop blocks 42 can be capable of transferring the force applied to first chain 12 in a direction parallel to first track 18 when stop blocks 42 are provided as connecting links 52. Connecting links 52 can be shaped or unshaped. A shaped connecting link 52 can comprise stop block 42 within the geometry of connecting link 52 or provide a protuberance on connecting link 52. It would also be possible to provide first chain 12 as a plurality of shaped connecting links 52. This could provide mating engagement without the need for separate first links 14 having a track follower 16 disposed proximate thereto and connecting links 52. An unshaped connecting link 52 does not have a stop block 42 within the geometry of connecting link 52.

In a preferred embodiment, a connecting link 52 can be manufactured from material that is greater in thickness than the material utilized to manufacture first links 14 having a track follower 16 disposed proximate thereto. This greater thickness can facilitate contact between proximate connecting links 52 when first chain 12 is in a compressed configuration. As first chain 12 transitions from a non-compressed configuration to a compressed configuration, the connecting links 52 can rotate about their respective pivot points, but cease to further pivot upon contact with an adjacent connecting link 52. Upon a contacting, or a mating, engagement between respective connecting links 52, a force applied to drive first chain 12 is then efficaciously transferred in the machine direction. This is due in part because, during contacting engagement, a pivotable joint is not the only connection between adjacent connecting links 52. Thus, when first chain 12 is stacked and stop blocks 42 are contacting, the load induced by first chain 12 as first chain 12 is pushed through the stacked configuration is propagated through stop blocks 42 to their respective links 52. This propagation can prevent a high load from acting on individual first links 14 and track followers 16 during transition from straight-line configuration to the stacked configuration. Therefore, it is preferable that the orientation of the major axis of each first link 14 remains constant during the transmission of a driven compressive force.

Once contact occurs between adjacent connecting links 52, there is no need for first track 18 to resist stacking of first chain 12. This could be because no load is exerted on an upper first track portion 20 of first track 18. Further, any load on a lower second track portion of first track 18 is from the weight of first chain 12. In sum, when the first chain 12 is folded to produce the stacked configuration, the stop blocks 42 can serve to define the pitch and/or otherwise limit the spacing between adjacent first links 14 having track followers 16 disposed thereon.

Figure 7:
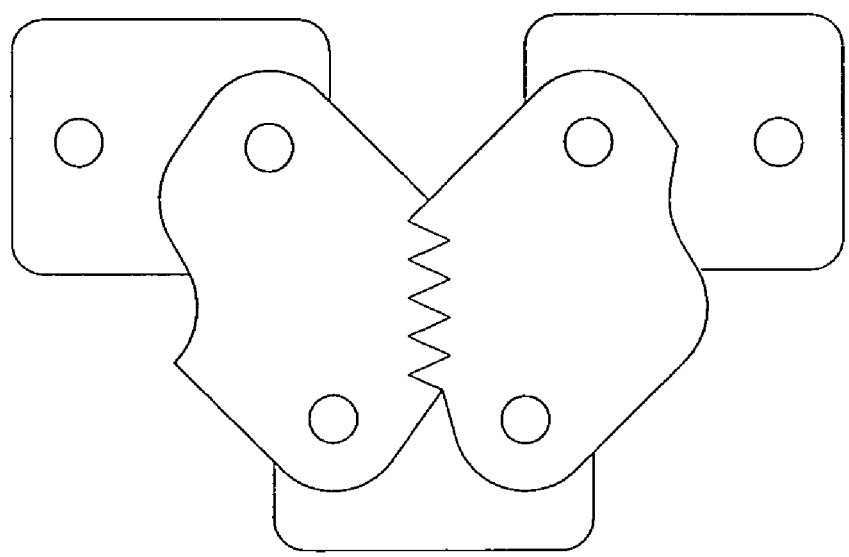
FIGS. 7–9 are exemplary embodiments of link plates according to the present invention.
Figure 8:
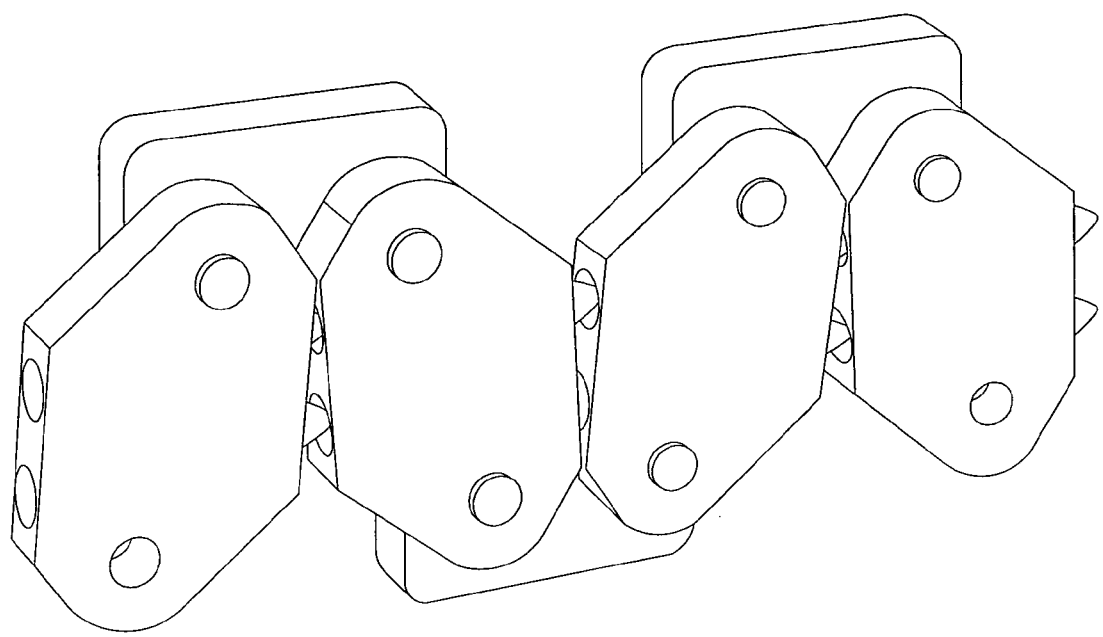

In the preferred embodiment shown in FIG. 4, the contacting surfaces of adjacent stop blocks 42 provide a curved edge in which one stop block 42 is convex and the mating stop block 42 is concave of approximately the same radius to distribute the load over a greater area and therefore, reduce mechanical stress. Additionally, as shown in FIG. 7, the nearly inter-locking shape, between adjacent stop blocks 42 can resist relative motion between first links 14 in the z-direction or cross-machine direction. As shown in FIG. 8, the nearly inter-locking shape (a quasi "ball-and-socket") between adjacent stop blocks 42 can resist relative motion between first links 14 in the z-direction and cross-machine direction. These interlocking shapes can further enable unitary movement of the compressed portion of first chain 12.

Figure 9:
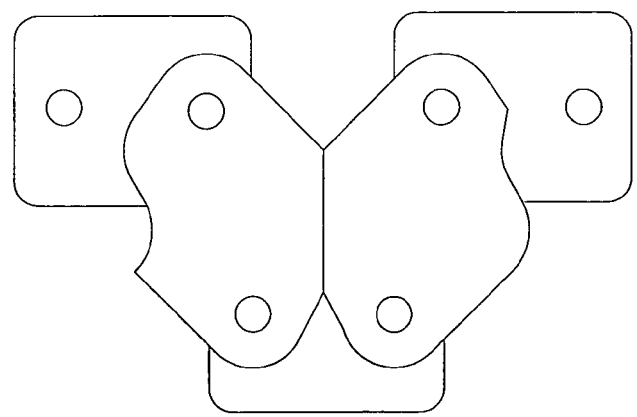

If the matingly engageable surfaces between adjacent stop blocks 42 were provided as mutually convex surfaces, the resultant driving force between adjacent stop blocks 42 could theoretically be provided as a line in the machine direction. As shown in FIG. 9, alternatively, the matingly engageable edges of adjacent stop blocks 42 could be planar. A planar shape can provide for a greater contact area between adjacent stop blocks 42 than a mutually convex system, thereby reducing a resulting mechanical stress. Additionally, This may result in high mechanical stresses in the region of contact between adjacent stop blocks 42. However, even a minimal contact between adjacent connecting links through stop blocks 42 can reduce deleterious forces generated against first track 18.

Exemplary Embodiment

Returning again to FIGS. 1 and 2, a conveyor 10 of the present invention can be constructed from a frame supporting four parallel shafts 44a–d with pillow block bearings near the end of each shaft 44a–d. One pair of each of roller chain sprockets 38a, 38b, 40a, 40b are then mounted on each of the four shafts 44a–d, between the bearings, separated by a distance of about 36 inches (91.4 cm).

In addition to the eight large sprockets 38a, 38b, 40a, 40b shown in FIG. 1, (the far-side four sprockets are hidden), each shaft 44a–d is also outfitted with a smaller drive sprocket 46a–d. The two, left end shafts 44a, 44b are coupled by a roller chain 48a around their smaller drive sprockets 46a, 46b and the two, right end shafts 44c, 44d are coupled by a roller chain 48b around their smaller drive sprockets 46c, 46d. Positioned below each coupled pair of shafts 44a–44b, 44c–44d is a drive motor—one drive motor 50 to drive the two left end shafts 44a, 44b, and one drive motor 56 to drive the two right end shafts 44c, 44d.

First chain 12 and second chain 26 (second chain 26 is hidden in FIG. 1) that wrap around the sprockets 38a, 38b, 40a, 40b can transport the optional carriers 28 in the machine direction around the process path. In this exemplary embodiment and as detailed in FIG. 6, the outboard carrier link plate 54 of first chain 12 and second chain 26 is outfitted with two cantilevered track followers 16. Successive carrier link plates are oriented so that the track followers 16 are on opposite sides of the chain pitch line.

Preferably, first chain 12 and second chain 26 are double pitched. That is, first links 14 having track followers 16 disposed thereon are of a shorter pitch than connecting links 52 in order to prevent first links 14 having track followers 16 disposed thereon from interfering with connecting link 52 as connecting links 52 deviate from the machine direction. However, one of skill in the art would be able to provide first links 14 having track followers 16 disposed thereon and connecting links 52 at any pitch ratio, including 1:1, suitable for the process, or system, required.

In this embodiment, both generally planar link plates 54 of each connecting link 52 of first chain 12 and second chain 26 are also provided as stop blocks 42 having an efficacious shaping to facilitate load and force transmission when first chain 12 and second chain 26 are in the compressed, or stacked, configuration. When the first chain 12 or second chain 26 is compressed, adjacent connecting link 52 plates comprising a stop block 42, or having stop blocks 42, disposed thereon can contact and/or matingly engage. Thus, the contoured shape of the connecting link 52 plates or the stop blocks 42 disposed thereon can then interlock the respective first and second links 14, 36 of first and second chain 12, 26 so conveyor 10 moves as a single unit.

In this embodiment, carriers 28 mounted between first chain 12 and second chain 26 can be attached to first links 14 and second links 36 having a common pitch position with respect to first chain 12 and second chain 26. First chain 12, second chain 26, and the associated carriers 28 can be supported in the span between sprockets 40a, 40b by rails (not shown). The rollers associated with first chain 12 and second chain 26 can then traverse the conveyor 10 on these rails. For all other spans, both first chain 12 and second chain 26 are supported by either first track 18, or second track 34, in a plane parallel to respective sprockets 40a, 40b.

Since first track 18 and second track 34 are adjacent to the sprockets 40a, 40b, first chain 12 and second chain 26 were provided with cantilevered track followers 16 that extend into grooves disposed on first track 18 and second track 34.

These grooves can then control the position and orientation of the links of first chain 12 or second chain 26 having track followers 16 disposed thereon as the respective links transition from a non-compressed configuration to a compressed configuration and back to a non-compressed configuration as shown in FIG. 4 and discussed supra.

The exemplary first track 18 of FIG. 3 is provided with tracks, in the form of grooves, of 4 different types. Moving from left to right (i.e., from upstream to downstream in a counter-clockwise conveyor rotation) first track 18 is divided into four sections (A–D). In section A, the grooves in first track 18 are concentric to the pitch circle of sprocket 40a. It is believed that this configuration can control the chain as it transitions from tension to compression. This can prevent the chain from falling off as it leaves the sprocket 40a. These cam groove paths are preferably circular.

In section B, the grooves provided in the first track 18 produce a transition zone between the upper sprocket 40a and lower sprocket 38a. It is believed that this can cause alternating links of first chain 12 having carriers 28 disposed proximate thereto, to separate in directions away from the first chain 12 pitch line, causing the first chain 12 to compress into a trapezoidal wave form as discussed supra. These grooves have a general elongated "S" curve shape that can be optimized to prevent large changes in the acceleration of the carriers.

In section C, the grooves provided in the first track 18 can accommodate and provide support for the first chain 12 during the compressed configuration. These grooves are generally provided as straight lines.

Within section D, the grooves provided in the first track 18 transitions between sprocket 38b and sprocket 40b. This section facilitates the movement of alternating links and carriers of first chain 12 toward the pitch line of first chain 12, causing first chain 12 to straighten into a tension, or non-compressed, configuration. These grooves in this section are provided as an elongated "S" curve shape, optimized to prevent step changes in the acceleration of the first links 14. However, one of skill in the art could provide these grooves and/or curves in such a manner to facilitate any degree or rate of changes in the acceleration of the first links 14 if the process so requires.

Methods of Use

It is believed that the conveyor of the present invention can be utilized in a variety of useful industrial and non-industrial applications. Non-limiting, exemplary uses are described herein.

EXAMPLE 1

The conveyor could be used to change the spacing between articles in a production and/or assembly process. In an exemplary process, it may be desirable to reduce scrap by cutting components from a continuous web of material at the closest allowable spacing. If these components must later be assembled with additional parts having a greater length in the direction of web travel, or machine direction, then it may be necessary to increase the spacing between the close-spaced components. For example, the close-spaced components could be transferred onto the conveyer while the conveyor is in a compressed configuration. These components could then be transferred off the conveyor at greater in-line spacing. Conversely, this process could be utilized in a like manner for objects requiring decreased in-line spacing.

EXAMPLE 2

The conveyor could be used to compressingly or stretchingly deform articles. For example, elastic waistband material could be attached to clothing material using the present conveyor. Here, every other link of the compressed configuration chain (those on the outside of the chain loop) could be attached to a continuous web of an elastic material. As the chain moves into a non-compressed configuration, the elastic would thereby be stretched. While the elastic remains in a stretched condition, the elastic can then be sewn to the clothing material. As the chain returns to the compressed configuration, the new composite web can then be relaxed and released from the conveyor and processed further, as required.

EXAMPLE 3

The present conveyor could be utilized to increase the volume of food items subjected to a cooking process. In cooking processes that require a finite cooking exposure time, the number of food items that are simultaneously cooked can be increased by placing the food items on the conveyer in a non-compressed configuration. As the conveyer assumes a compressed configuration, the density of food items is increased, resulting in an overall higher cooker throughput without decreasing residence time in the cooker.

EXAMPLE 4

The present conveyor could also be utilized to provide a multi-level building function. The article carriers could be constructed with a built-in offset from the chain pitch line so that the articles remain outside of the chain loop. A single level stream of articles could be transferred to the carriers while the conveyor is in a non-compressed configuration. Once the chain is in a compressed configuration, a two level stream of articles is then formed. These two levels of articles could then be diverted to separate single level streams or transferred together as a two level stack of articles. Further, articles can be subjected to different processes or conditions in each level.

While particular embodiments of the present invention have been illustrated and described, it would be obvious to those skilled in the art that various other changes and modifications can be made without departing from the spirit and scope of the invention. Many of the aspects of the present invention found to offer advantages over the state of the art can be used separately or in any suitable combination to achieve some or all of the benefits of the invention disclosed herein.

What is claimed is:

1. A conveyor system comprising:
   (a) a first track having a machine direction, a cross-machine direction orthogonal thereto, and a Z-direction orthogonal to said machine direction and said cross-machine direction;
   (b) a first chain comprising a plurality of successive connected links operatively associated with said first track, whereby said chain can move in said machine direction along said first track;
   (c) said first track having a first track portion and at least a second track portion, said first track portion and said second track portion being spaced apart in at least one of said cross-machine direction or said Z-direction; and
   (d) a first plurality of track followers disposed on a first portion of said links operatively associated with said first track portion, a second plurality of track followers disposed on a second portion of said links operatively associated with said second track portion, and a third plurality of said links spanning the spacing between said first track portion and said second track portion whereby said chain is foreshortened in said machine direction.

2. The conveyor of claim 1, further comprising a second track, said second track being spaced apart from said first track in said cross-machine direction, said second track having a second chain operatively associated therewith, said first chain and said second chain being joined together by an extensible carrier extending therebetween in said cross-machine direction.

3. The conveyor of claim 1, wherein said chain alternatingly comprises odd numbered links and even numbered links, a first plurality of said odd numbered links having one of said track followers operatively associated with said first track portion of said first track, and a second plurality of said odd numbered links having one of said track followers which mates with said second track portion of said first track, and said even numbered links spanning the distance between said first track portion and said second track portion in said Z-direction.

4. The conveyor of claim 3, wherein each link of said chain has a major axis, a first plurality of said even numbered links comprising a protuberance extending outwardly from each of said even numbered links in a common direction when said links of said chain form a straight line configuration, said protuberances of said even numbered links contacting protuberances of successive even numbered links to transmit a compressive force therebetween when said chain is driven in said machine direction and simultaneously operatively associated with said first track portion and said second track portion.

5. The conveyor of claim 4, wherein a first of said contacting protuberances disposed upon a first of said even numbered links has a concave contacting surface disposed thereon and a second of said contacting protuberances disposed upon a successive even numbered link has a convex contacting surface disposed thereon.

6. The conveyor of claim 1, wherein said track follower comprises a roller connected to said successive link, said roller being matingly engageable with at least one of said first track portion or said second track portion.

7. The conveyor of claim 1, wherein said first track portion and said second track portion diverge from a common track portion.

8. A conveyor comprising:
(a) a track having a machine direction, a cross-machine direction, and a Z-direction, said track having a first portion and a second portion spaced apart in at least one of said cross-machine direction or said Z-direction;
(b) a chain comprising a plurality of interconnected links operatively associated with said track, each of said links having a major axis substantially parallel to said machine direction, said major axis having an orientation;
(c) at least one track follower disposed upon alternating links of said plurality of interconnected links, a first of said alternating links being operatively associated with said first track portion and a successive alternating link being operatively associated with said second track portion; and,
wherein upon engagement of said first alternating link with said first track portion and engagement of said successive alternating link with said second track portion, said orientation of said major axis of a link intermediate thereto changes in at least one of said cross-machine direction or said Z-direction whereby said major axis is skewed relative to said machine direction.

9. The conveyor of claim 8, wherein said major axis is skewed relative to said machine direction at an angle ranging from 1 degree to 90 degrees.

10. A conveyor comprising:
(a) a track configured to move along a machine directional path, wherein the track comprises first and second portions separated from one another at at least one location along the path;
(b) a chain comprising track links operatively associated with the track, wherein the track links alternate along the first and second portions of the track, wherein the track links associated with the first portion are operable to diverge from the track links associated with the second portion; and
(c) at least one track follower associated with each track link and the respective portion of the track that the track link is associated with, wherein the track follower guides its associated link along the respective path of the respective track portion, thereby foreshortening the chain along the machine directional path.

11. The conveyor of claim 10, wherein the conveyor comprises a second chain operably configured with the track to operate in tandem with the other chain.

12. The conveyor of claim 10, wherein the conveyor further comprises connecting links configured to connect a track link and its associated track follower.

13. The conveyor of claim 10, wherein the conveyor further comprises stop blocks associated with a first track portion associated link and a second track portion associated link.

14. The conveyor of claim 13, wherein adjacent stop blocks are configured to engage with each other.

15. The conveyor of claim 14, wherein each stop block comprises a convex surface on one side and a concave surface on another side, and adjacent convex and concave surfaces are matingly engageable.

16. The conveyor of claim 14, wherein adjacent stop blocks have interlocking members.

* * * * *